April 28, 1925.
H. C. BUFFINGTON
TOWING POLE
Filed March 28, 1924
1,535,397
2 Sheets-Sheet 1
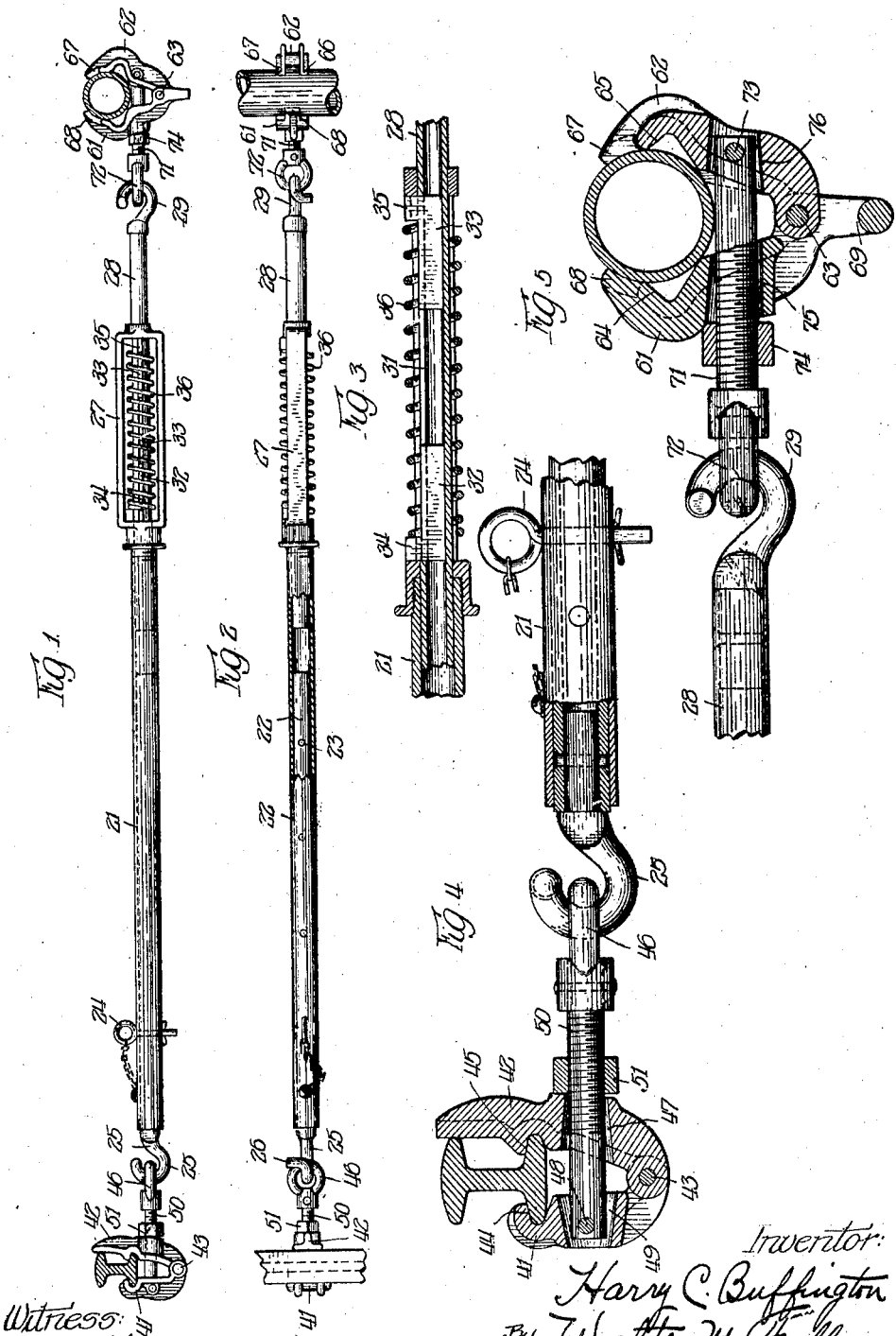

April 28, 1925. 1,535,397
H. C. BUFFINGTON
TOWING POLE
Filed March 28, 1924 2 Sheets-Sheet 2
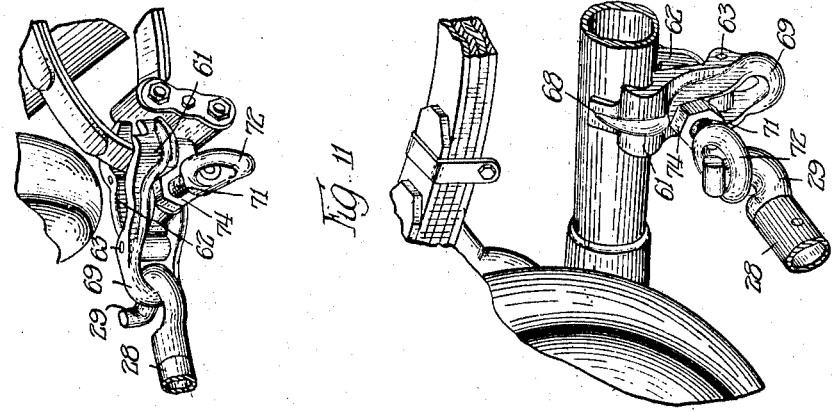
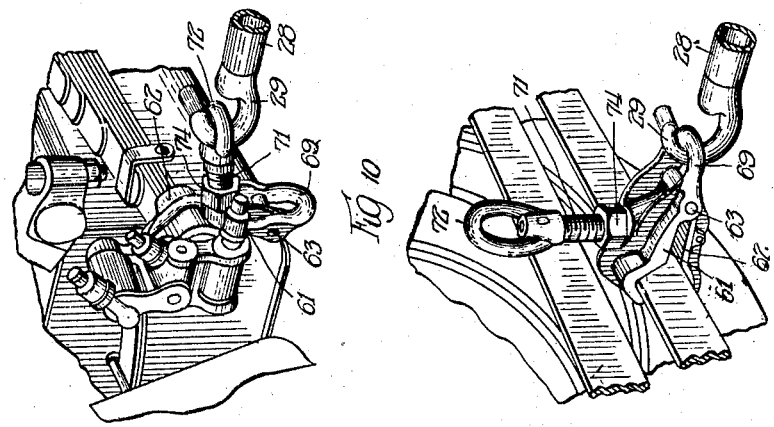
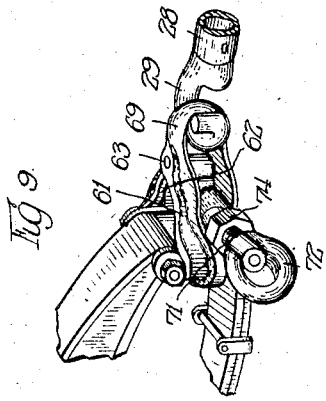
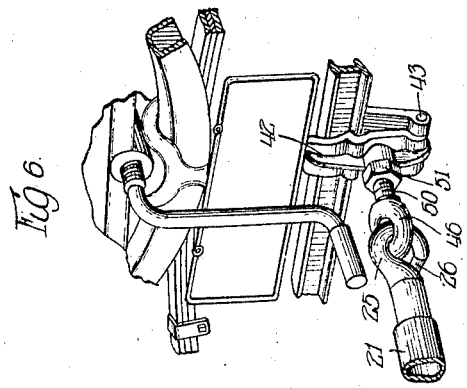
Witness
R. Burkhardt
Inventor:
Harry C. Buffington
By Walter M. Fuller atty Patented Apr. 28, 1925.

1,535,397

UNITED STATES PATENT OFFICE.

HARRY C. BUFFINGTON, OF SPRINGFIELD, ILLINOIS, ASSIGNOR TO WEAVER MANUFACTURING COMPANY, OF SPRINGFIELD, ILLINOIS, A CORPORATION OF ILLINOIS.

TOWING POLE.

Application filed March 28, 1924. Serial No. 702,611.

*To all whom it may concern:*

Be it known that I, HARRY C. BUFFINGTON, a citizen of the United States, residing at Springfield, in the county of Sangamon and State of Illinois, have invented certain new and useful Improvements in Towing Poles, of which the following is a specification.

This invention concerns towing appliances commonly used in connection with disabled automobiles and trucks whereby the incapacitated vehicle may be drawn to some suitable point for repairs.

One aim of the invention is to provide a substantially-rigid connection between the towing car and the crippled towed vehicle, thus preventing the rear one from ramming or jamming the one ahead on sudden stops or on down grades and eliminating similar dangers incident to the use of the ordinary tow line.

Another purpose of the invention is to equip the towing pole with end jaw clamps which enable the appliance to be satisfactorily applied to the front or rear end of any ordinary make and style of car.

These clamping or fastening structures are based on the principle of the bench vise and will hold rigidly and securely without danger of slipping or marring the car under most severe strain.

One set of these clamping jaws desirably has two eyes or loops which facilitate its application in approved manner to the pole and to the car.

At each end the pole has a hook which connects to the corresponding clamping jaws in such a way as to form an extremely simple and effective substantially universal joint which allows ample play in any direction when turning corners, towing over rough roads, etc., thus overcoming any material tendency to bend the pole.

These pole hooks are so constructed and designed that it is impossible for them or either of them to become unhooked or disconnected in towing when both are fastened.

The new towing pole is amply rigid to enable a car to be pushed as well as pulled, which is often an advantage under crowded conditions where there is insufficient room to tow or pull the car into the desired position.

A heavy coiled spring constitutes a cushion and takes any strain in starting from the towing car as when in a rut, since it enables the engine to turn over freely at first and gradually assume the load while the spring is being contracted. In this way severe jerks and strains in starting are eliminated, which are impossible to avoid when an ordinary tow-line or perfectly rigid connection is used. This cushion pole also absorbs any shocks when towing over rough roads or when starting and stopping quickly in traffic.

Various other benefits and advantages from the use of the improved device will become apparent from the following detailed description of the construction and operation of the structure.

To enable those skilled in this art to have a full and complete understanding of the invention, both from structural and functional standpoints, in the accompanying drawings forming a part of this specification, and throughout the several views of which like reference characters refer to the same parts, I have illustrated a desirable and preferred embodiment of the invention but it is to be remembered that the invention is susceptible of a variety of embodiments falling within the scope of the appended claims.

In these drawings:

Figure 1 is an elevation of the new and improved towing pole with its end clamps secured to bodies of different shapes;

Figure 2 is a top plan view of the structure shown in Figure 1 with a part broken away to more clearly indicate the interior construction;

Figure 3 is a fragmentary vertical central section on an enlarged scale through the cushion portion of the towing pole;

Figure 4 depicts partly in elevation and partly in vertical section one end portion of the towing pole and one of the clamping devices;

Figure 5 is a similar view of the opposite end of the towing pole; and

Figures 6 to 11 inclusive illustrate in perspective several different ways of attaching the towing pole to different parts of automobiles.

Referring to these drawings, it will be perceived that the new towing pole comprises an outer tubular member 21 having a hollow rod 22 telescopically received in one end, the rod having a number of spaced holes 23 adapted to accommodate a pin 24 extended through a hole in the outer or encasing member 21, whereby the pole as a whole may be elongated or shortened as occasion requires.

The protruding end of the inner hollow rod is fitted with a hook 25 having a laterally extended end 26.

At its other end, member 21 has a yoke 27 screwed thereon and extended and slidable through aligned holes in the end members of such yoke and into the corresponding end of the tubular element 21, another inner hollow or tubular member 28 is employed, the outer end thereof being supplied with a corresponding or complementary hook 29.

The part 28 has a longitudinal slot 31 and internally this member accommodates a pair of slidable pressure-blocks 32 and 33 extended laterally out through the slot 31 and provided externally thereof with lugs 34, 35 between which and surrounding the cylindrical element 28 and inside of the yoke there is a coil or cushion spring 36.

Obviously when the pull is exerted on the pole at its left-hand end, as the pole is illustrated in Figures 1, 2 and 3, and the load is imposed on the other end of the pole, the right-hand end of the yoke will, through the plate or block 33 and its lug 35, compress the spring toward the left, the other end of the spring being prevented from movement in that direction by the engagement of block 32 with the left-hand end of slot 31, thus securing adequate cushioning effect between the source of power applied to the one end of the pole and the load attached to its other end.

When the pull is exerted on the right-hand end of the pole with the load secured to the other end, the left-hand end-wall of slot 31 pushes block 32 to the right compressing the spring between itself and the other block 33 which bears against the right-hand end of the yoke.

Thus adequate and proper cushioning results are secured regardless of how the pole may be fastened to the towing and towed vehicles.

At one end of the towing pole, the means for attachment to a part of the vehicle to be pulled or to that of the vehicle performing the drawing or hauling, comprises two jaws 41 and 42 pivoted or hinged together at their lower ends at 43, the jaw 41 having a recess 44 on its inner face adapted to receive a flange of a front axle 45 or any other part of the vehicle, the companion jaw 42 having a like registering recess on its inner face for a similar purpose.

Jaw 42 is preferably, but not necessarily, longer than the associated jaw to bear against the outer face of the axle or other element of the automobile to assist in preventing the jaws from responding to any tendency to rock around the lower flange grasped between the two jaws.

A screw-threaded rod 50 fitted at one end with a loop or eye member 46 designed to receive the hook 25 or 29, is disposed transversely of the clamping jaws, extending through an aperture 47 in the jaw 42 and being pivoted or hinged at 48 to the jaw 41 on a cross-pin in a recess 49 in such jaw.

A nut 51 on the rod permits the jaws to be forced toward one another to securely grasp or clamp the axle or other part of the vehicle as shown in Figure 4 and by backing away the nut on the rod the clamp may be opened to free such part.

The complementary clamp at the other end of the pole, it being understood of course that these two clamping members are interchangeable if desired, comprises a pair of jaws 61, 62 hinged together at 63, recessed in register at 64, 65 on their inner faces, to enable them to securely grasp bodies of different shapes, such as those of cylindrical cross-section, like rear axle housings.

The upper end of jaw 62 is bifurcated at 66, 67, Figure 2, whereas the corresponding part of the other companion jaw 61 has a single reduced thickness end portion 68, which, if occasion demands, may be received in the space between the parts 66 and 67 when the clamp is grasping a small body.

If desired, the inner faces of the portions 66, 67 and 68 of the clamp may be curved to more readily and effectively clamp cylindrical or round bodies.

The lower portion of jaw member 61 is recessed or bifurcated to receive between its spaced walls the lower end portion of the other jaw member 62, the two being hinged together at this point on the hinge-pin 63 as stated.

Below or beyond the hinge-pin, the jaw member 61 is shaped to provide an attachment loop or eye 69 which may, if desired, be applied to the towing-pole hook.

The two jaw members are equipped with a threaded rod 71, eye 72, hinge-pin 73 and tightening-nut 74 as is the other clamp at the opposite end of the pole, and in similar manner the two jaw members have corresponding apertures or recesses 75 and 76, whereby the clamp may be tightened or loosened as is necessary for the performance of the required functions.

In Figures 4 to 11 inclusive, I have shown several ways in which the connections may be made to different parts of the car.

In Figures 4 and 6, the clamp 41, 42 is shown applied to an I-beam front axle and the hook 25 may extend up as illustrated in Figure 4 or may be reversed as depicted in Figure 6.

Figure 7 portrays the attachment of the clamps 61, 62 to a platform spring, the loop 72 being associated with the towing pole hook which projects upwardly.

In Figure 8 the same clamp is illustrated fastened to a rear leaf spring, the loop 69 being used with the towing pole hook arranged horizontally or sidewise.

Figure 9 shows a somewhat similar arrangement with the clamp secured to a rear spring shackle.

In Figure 10 the same clamp is illustrated fastened to a rear or front bumper.

In Figures 5 and 11 such clamp is shown secured to a rear axle or housing, the loop or eye 72 being used in association with the hook.

Those skilled in this art will readily understand that various minor mechanical changes may be made in the structure illustrated and described without departure from the heart and essence of the invention and without the sacrifice of any of its substantial benefits and advantages.

I claim:

1. The combination of a towing-pole and an end attachment means therefor comprising in combination a pair of companion jaw-members of different lengths hinged together and recessed in register on their inner faces, the greater length portion of said longer member being constructed to engage the element grasped by said members and to prevent turning of the members on said element, and means to force said members toward one another to grasp a portion of a vehicle between them and accommodated at least in part in said recesses.

2. The combination of a towing-pole and an end attachment means therefor comprising a pair of companion jaw-members hinged together and at least one of which is recessed on its inner face, in combination with a threaded rod associated with said jaw-members transversely of the latter and having means for connection with the towing-pole, and threaded means on said rod adapted to force said jaw-members toward one another to grasp a part of the vehicle between them with at least a portion thereof in said recess.

3. The combination of a towing-pole and an end attachment means therefor comprising a pair of companion jaw-members hinged together near one end and both recessed on their inner faces in register, one of said jaw-members being longer than the other, in combination with a threaded rod associated with said jaw-members transversely of the latter and having means for connection with the towing-pole, and threaded means on said rod adapted to force said jaw-members toward one another to grasp a part of the vehicle between them with at least a portion thereof in said recesses.

4. The combination of a towing-pole having an end hook with a terminal portion bent outwardly substantially at right angles to the plane of the hook and an attachment means having a loop receiving said hook and comprising a pair of companion jaw-members hinged together near one end and recessed in register on their inner faces, and screw-threaded means disposed transversely of said jaw-members adapted to force the latter toward one another to grasp a portion of a vehicle between them with at least a part thereof accommodated in said jaw recesses.

5. The combination of a towing-pole having an end hook with a terminal portion bent outwardly substantially at right angles to the plane of the hook and an attachment means comprising a pair of jaw-members hinged together near one end and recessed in register on their inner faces, and screw-threaded means disposed transversely of said jaw-members and equipped with a loop designed to receive said towing-pole hook and adapted to force said jaw-members toward one another to grasp a portion of a vehicle between them with at least a part thereof accommodated in said recesses.

6. The combination of a towing-pole having an end hook with a terminal portion bent outwardly substantially at right angles to the plane of the hook and an attachment means comprising a pair of companion jaw-members of different lengths hinged together near one end and recessed in register on their inner faces, and a screw-threaded rod disposed transversely of said jaw-members and equipped with a loop at one end designed to receive said towing-pole hook, and a nut on said rod adapted to force said jaw-members toward one another to grasp a portion of a vehicle between them with at least a part thereof accommodated in said jaw recesses.

7. The combination of a towing-pole and an end attachment means therefor comprising in combination a pair of jaw-members hinged together and at least one of which is recessed on its inner face, a screw-threaded rod rockingly mounted on one of said members and extended through an aperture of the other member, and threaded means on said rod adapted to force said members toward one another to grasp a portion of a vehicle between them and accommodated at least in part in said recess.

8. The combination of a towing-pole and an end attachment means therefor comprising in combination a pair of jaw-members of different lengths hinged together and recessed in register on their inner faces, a screw-threaded rod rockingly mounted on one of said members and extended through an aperture of the other member, said rod having a loop adapted to receive a terminal hook on said towing-pole, and a nut on said rod adapted to force said jaw-members toward one another to grasp a portion of the vehicle between them and accommodated at least in part in said recesses.

In witness whereof I have hereunto set my hand and seal.

HARRY C. BUFFINGTON. [L. S.]